US012493283B2

(12) United States Patent
Kitamura et al.

(10) Patent No.: US 12,493,283 B2
(45) Date of Patent: Dec. 9, 2025

(54) MACHINING CENTER AUTOMATIC OPERATING SYSTEM

(71) Applicant: KITAMURA MACHINERY CO. LTD., Toyama (JP)

(72) Inventors: Akihiro Kitamura, Toyama (JP); Toshihisa Tanada, Toyama (JP); Kazutaka Kitamura, Toyama (JP)

(73) Assignee: KITAMURA MACHINERY CO., LTD., Takaoka (JP)

( * ) Notice: Subject to any disclaimer, the term of this patent is extended or adjusted under 35 U.S.C. 154(b) by 174 days.

(21) Appl. No.: 18/275,292

(22) PCT Filed: Jul. 28, 2022

(86) PCT No.: PCT/JP2022/029152
§ 371 (c)(1),
(2) Date: Aug. 1, 2023

(87) PCT Pub. No.: WO2023/017742
PCT Pub. Date: Feb. 16, 2023

(65) Prior Publication Data
US 2024/0134351 A1    Apr. 25, 2024
US 2024/0231320 A9    Jul. 11, 2024

(30) Foreign Application Priority Data

Aug. 11, 2021  (JP) ................................. 2021-131069

(51) Int. Cl.
  *G05B 19/4155*   (2006.01)
  *B23Q 15/12*   (2006.01)
(52) U.S. Cl.
  CPC ......... *G05B 19/4155* (2013.01); *B23Q 15/12* (2013.01); *G05B 2219/35513* (2013.01)
(58) Field of Classification Search
  CPC ...... G05B 19/4155; G05B 2219/35513; B23Q 15/12
  See application file for complete search history.

(56) References Cited

U.S. PATENT DOCUMENTS 9,541,918 B2 *  1/2017  Shi ..................... G05B 19/4185
10,399,197 B2 *  9/2019  Chen .................. B23Q 3/15546
(Continued)

FOREIGN PATENT DOCUMENTS

CN         105094089 A  * 11/2015  ......... G05B 19/4186
CN         10 6292535 A    1/2017
(Continued)

OTHER PUBLICATIONS

International Preliminary Examination Report dated Feb. 13, 2024 issued in corresponding PCT application No. PCT/JP2022/029152.
Office Action issued on Jul. 15, 2025 in corresponding Taiwan application No. 111126411.
Search Report dated Oct. 18, 2024 issued in corresponding PCT application No. PCT/JP2022/029152.
Search report dated Sep. 20, 2022 issued in corresponding PCT application No. PCT/JP2022/029152.

*Primary Examiner* — William P Bartlett
(74) *Attorney, Agent, or Firm* — BACON & THOMAS, PLLC

(57) ABSTRACT

An automatic operation system in which automatic operation control can be selectively exercised on a plurality of previously registered machining centers from a remotely located terminal via a cloud server is provided. The machining center automatic operating system includes: a cloud-side control unit that is provided in a cloud server connected to a CNC device of each machining center via a communication line, generates a machining command for each machine tool at an automatic machining command generation unit, and transmits the machining command to a corresponding CNC device; and one or more terminals that transmit inputted three-dimensional CAD design data of an intended machined product to the cloud-side control unit via the communication line and display design information transmitted from the cloud-side control unit on a display unit. The cloud-side control unit includes a cloud-side storage unit holding a registration list of all the machining centers to be driven and controlled, tool information and a learned model (Continued)

of each machine tool. The automatic machining command generation unit applies features extracted from three-dimensional CAD design data to a corresponding learned model together with tool information, thereby automatically sets machining conditions required for cutting operation for each feature and a manufacturing process including a tool trajectory based on the machining conditions, and generates a machining command corresponding to a series of all the manufacturing processes set by determining an execution procedure based on the learned model. And the automatic machining command generation unit is provided with a function of, before the tool information is applied to the learned model, referring to the latest tool information stored in a corresponding CNC device-side storage unit and updating the tool information.

6 Claims, 6 Drawing Sheets

(56) References Cited

U.S. PATENT DOCUMENTS

| | | |
|---|---|---|
| 2019/0278878 A1 | 9/2019 | Sawyer et al. |
| 2019/0384258 A1 | 12/2019 | Nordell et al. |
| 2022/0317656 A1 | 10/2022 | Kitamura et al. |

FOREIGN PATENT DOCUMENTS

| | | |
|---|---|---|
| EP | 1 097 411 B1 | 5/2001 |
| JP | 2016 071407 A | 5/2016 |
| JP | 2020 024676 A | 2/2020 |
| JP | 6 719 790 B1 | 6/2020 |
| JP | 2020 129220 A | 8/2020 |
| JP | 2021 012542 A | 2/2021 |
| JP | 2021 039657 A | 3/2021 |
| TW | 201024021 A | 7/2010 |
| WO | 2021 122548 A1 | 6/2021 |

* cited by examiner

MACHINING CENTER AUTOMATIC OPERATING SYSTEM

TECHNICAL FIELD

The present invention relates to a machining center automatic operating system that is capable of selectively controlling automatic operation of a plurality of previously registered machining centers with a remotely located terminal via a cloud server. More specifically, the present invention relates to a system for, with respect to a selected machining center, applying a dedicated learned model on the cloud side to generate a machining command based on three-dimensional CAD design data of a machined product inputted from a terminal and automatically driving and controlling a manufacturing process in accordance with the machining command at a targeted machine tool.

BACKGROUND ART

With respect to present machine tools, in many cases, each have an automatic tool change function, and are controlled and driven as machining center equipped with a numerical control device, a so-called NC (Numerical Control) device or a computerized numerical control device, a so-called CNC (Computerized Numerical Control) device. A machine tool is controlled by a numerical controller so that it automatically cuts a material according to a predetermined NC machining program to form an intended product.

An NC machining program is generated based on machining conditions including a tool to be used and numeric data (NC data) such as a movement related to X, Y, Z coordinate axes or simultaneous 5 axes (X, Y, Z, A, C) in advanced machine tools and a speed of the tool during machining with the tool, and numerical control information on a manufacturing process. Further, in the CNC device, automation is promoted by automatically calculating part of the numerical control information such as correction of a tool diameter, interpolation operation, speed control, and the like with a built-in computer.

Therefore, to generate an NC machining program for obtaining a machined product in an intended shape by cutting a material to be machined via automatic operation of a machine tool, a machining condition and a manufacturing process for the program must be set beforehand. Each manufacturing process is determined based on a machining method for cutting each feature to be formed in a machined product. Features cite here refer to step heights of projections and depressions, surface shapes of curves, holes, pockets, slots, and the like in machined products. A tool suitable for forming these features is appropriately selected from, for example, various milling cutters, various drills, various end mills, and the like. And a machining condition including a cutting condition is established for each selected tool, and a tool trajectory is determined based on the machining conditions. Further, a manufacturing process including the above tool selection, tool change, and execution of each tool trajectory is established and an NC machining program corresponding to the manufacturing process is generated.

Usually, an NC machining program corresponding to the manufacturing process for cutting each feature is generated by an engineer using an NC language, such as G code and M code, based on a CAD (Computer Aided Design) design drawing of an intended product. However, there are many cases where machining has been performed with a sophisticated machine tool, such as simultaneous up to five-axis (X, Y, Z, A, C) control. For this reason, more complicated control in which these multiple axes will not interfere with one another and the cutting can be performed automatically smoothly is required. Therefore, an NC machining program is also generated using CAM (Computer Aided Manufacturing) system based on a three-dimensional CAD diagram.

Owing to CAM operation, code need not be directly manually inputted but a complicated machining program need be generated through machining method consideration, tool selection, and machining condition determination by a skilled hand and is thus time-consuming. Consequently, various devices for automatically creating a machining program have been considered.

Among them, there is a "DEVICE FOR AUTOMATICALLY OPERATION MACHINING CENTER USING CAD DATA" developed by the present inventors (Refer to Patent Literature 1.). This is a device that only with three-dimensional CAD design data of an intended machined product, machining command is automatically generated without need for skilled-labor's knowledge and enables immediate execution of the machining process on the spot. In this automatic operation device, by causing three-dimensional CAD design data of an intended machined product to be acquired, possible mounting directions are immediately proposed through a 3D model display in a selectable manner and the most suitable mounting direction can be selected and determined, and at the same time the features of the product are extracted. And then, based on the determined mounting direction, extracted features are applied to a learned model and a machining command causing a machine tool to perform all the manufacturing processes required for obtaining the machined product is automatically generated in a short time.

CITATION LIST

Patent Literature

[PTL 1]
Japanese Patent Publication No. 6719790
[PTL 2]
Japanese Unexamined Patent Application Publication No. 2016-71407
[PTL 3]
Japanese Unexamined Patent Application Publication No. 2021-12542

SUMMARY OF THE INVENTION

Problems to be Solved by the Invention

In recent years, however, demanded machined products have been complicated in addition to other reasons and in conjunction therewith, volumes of 3D design data have also been increased. Further, when such a complicated manufacturing process is updated, the volume of data of a relevant learned model is also increased. For this reason, in each machining center, a control device equipped in a machine tool involves a problem of capacity and requires higher performance for a data processing function; therefore, a larger burden is placed on the machine side and a cost is accordingly increased. Although the steps of generation to execution of a machining command are substantially automatically performed and required operations are only less time-consuming and simple operations, including initial entry of 3D CAD design data and selection and determination of a mounting direction, since these operations used to be performed on a CNC operation panel on the machined side by an operator, the processing is inevitably restricted onsite.

Meanwhile, a machine tool in which the functionality of a control device is partly shared between the control device and a cloud server to reduce a burden is also proposed. An example is configured as follows: A numerical control device is separated into the side of a host computer (cloud) on a network and the machine tool side. On the cloud side, software for CNC control and display control is run and on the machine tool side, software for servo control and spindle control is run to operate a machine. Each piece of software and hardware is managed and maintained on the cloud side and thus a maintenance const for a machine tool can be reduced. (Refer to Patent Literature 2.)

Further, such an administrative computer as described below is also proposed to help resolving degradation in machining accuracy of each machine tool due to aging. The rigidity of a spindle and components, such as tools, of a machine tool is measured on the machined product manufacturer side and resulting measurement information is transmitted to a cloud server. A machining program is generated based on the rigidity measurement information received on the cloud server and basic machining data and further the rigidity measurement information is transmitted to a machine tool manufacturer computer and a tool manufacturer computer. (Refer to Patent Literature 3.)

As mentioned above, there is a proposal to utilize a cloud server mainly to manage a plurality of machine tools. However, in such a proposal, a CAM system is not used. Further, the following operations cannot be remotely and simply performed via a cloud server: a feature is extracted from an intended machined product based on 3D CAD design data of the machined product; a machining command to obtain each feature is automatically generated by applying a learned model in a proposed and selected optimum mounting direction; and an arbitrary machining center is caused to execute the machining command.

In consideration of the foregoing, it is an object of the present invention to provide a machining center automatic operating system in which a cloud server is utilized for a plurality of machining centers; necessity for providing a control device on the machine tool side with large data storage capacity or high-performance data processing capability is obviated and an operator is not restricted by the machine tool side; a machining command can be automatically generated for a machine tool of a selected machining center based on three-dimensional CAD design data of an intended machined product; and the machine tool can be caused to execute the machining command.

Means of Solving the Problem

To achieve the above object, the present invention is a machining center automatic operating system selectively exercising automatic operation control on a plurality of machining centers, each equipped with a CNC device exercising numerical control on its machine tool and an automatic tool changer. The automatic operation system includes:
  a cloud-side control unit that is provided in a cloud server on a network connected to the CNC device of each machining center via a communication line, and configured to generate a machining command for each machine tool and transmit the machining command to a relevant CNC device; and
  one or more terminals configured to display information transmitted from the cloud-side control unit on a display unit, input a three-dimensional CAD design data of an intended machined product and transmit the three-dimensional CAD design data to the cloud-side control unit via a communication line.

Each of the CNC devices includes:
  a CNC device-side control unit configured to exercise driving control on a machining unit of the machine tool and the automatic tool changer in accordance with the predetermined machining command, replacing and attaching a tool to a rotary spindle of the machining unit in correspondence with each manufacturing process contained in the machining command and, while doing this, for execution of cutting operation on a material to be machined; and
  a CNC device-side storage unit holding tool information including: identification information of a plurality of tools so housed that the tools can be changed and attached to the rotary spindle via the automatic tool changer; housing position information of each tool; and the material and shape of each tool corresponding to the identification information.

The cloud-side control unit includes:
  an automatic machining command generation unit configured to automatically generate the machining command causing the machine tool of one preselected machining center to perform all the manufacturing processes required to cause the machine tool to cut the material to be machined into the intended machined product, based on the three-dimensional CAD design data transmitted from the terminal; and
  a cloud-side storage unit holding a registration list in which all the machining centers to be drive-controlled are registered together with their machine type information.

The cloud-side storage unit holds tool information and learned models for each machine tool; the each learned model was generated in advance by learning, with respect to each feature subjected to various cutting operations, machining conditions including a used tool and cutting conditions when a relevant cutting operation was performed and machining data including a tool trajectory and an executing program for the trajectory in correspondence with each other.

The automatic machining command generation unit is configured to have the following functions:
  a feature extraction function of extracting features to be subjected to cutting operation from three-dimensional CAD design data of the intended machined product relative to the shape of the material to be machined;
  an automatic manufacturing process setting function of: automatically determining machining conditions required for cutting operation with respect to each feature by applying, to the learned model corresponding to the selected machining center, corresponding tool information as well as each feature extracted by the feature extraction function; and automatically setting a manufacturing process including a tool trajectory based on the machining conditions;
  an all the manufacturing processes setting function of determining a procedure for performing all the manufacturing processes for the features extracted by the feature extraction function and setting a series of all the manufacturing processes required for completing the intended machined product; and a machining command generation function of generating the machining command for causing the machine tool to perform all the set manufacturing processes based on the learned model. And the automatic machining command generation unit is configured to transmit the generated machining command to the relevant CNC device-side control unit.

The automatic manufacturing process setting function of the automatic machining command generation unit includes:

a tool information updating function of updating the tool information applied to the learned model together with each the feature referring to the latest tool information stored in the CNC device-side storage unit of the selected machining center before the application of the tool information; and a function of: generating a 3D model of the intended machined product based on the three-dimensional CAD design data and causing the 3D model to be displayed on the display unit of the terminal; and selecting one or more different mounting directions of the machine tool of the intended machined product possible in the machining unit and causing the 3D model to be displayed on the display unit of the terminal in each the selected mounting direction in a selectable manner. The automatic manufacturing process setting function automatically sets the manufacturing process for cutting operation for each feature using the updated latest tool information based on one mounting direction selected at the terminal.

The terminal is configured to have a function of, after the machining command generated at the automatic machining command generation unit is transmitted to the CNC device-side control unit, transmitting a machining command start signal to the cloud-side control unit with an operator's arbitrary timing or when a preset time has come.

The cloud-side control unit further includes a machining command start instruction unit configured to, when the machining command start signal is received from the terminal, transmit a machining command start instruction signal to the CNC device-side control unit for causing the machine tool to perform cutting operation in accordance with the machining command.

The machining conditions cited in relation to the present invention are the same as machining conditions set on an ordinary machine tool. The machining conditions are conditions required for determining the manufacturing process and mainly includes the type, shape, diameter and material for each tool, and cutting conditions including main spindle rotational speed, cutting feed, cutting width, depth of cut (in Z direction) for each cutter, and the like as well as the properties of the material to be machined, the clamping method with the machining unit jig, clamping position, mounting direction, and the like for the material. the tool trajectory, so-called tool path is determined for obtaining each intended cut feature based on these machining conditions.

According to the present invention configured as mentioned above, an operator can select suitable one from among the plurality of previously registered machining centers based on three-dimensional CAD design data of the intended machined product at the terminal in a company building or an office where he/she performs daily work via the cloud server. Even when the selected machining center is installed in a remote facility, such as a factory, the operator can generate a machining command for the machining center and remotely cause automatic operation according to the machining command. As a result, the operator need not move to the facility where the targeted machining center is located and thus the intended machined product can be accordingly simply manufactured in a short time.

Further, not only the registration list containing machine type information of each registered machining center is stored in the cloud-side storage unit. Tool information and learned models for each machine tool of each machining center are also stored, and each the learned model was generated by previously leaning machining conditions, including used tool and cutting conditions used when relevant cutting operation was performed, and machining data, containing the tool trajectory and the executing program therefor, on a feature-by-feature basis in varied cutting operations, in correspondence with each other. Therefore, the learned model applied to automatic generation of a machining command for the targeted machine tool need not be stored on the CNC device side. and further, generation of the 3D model in each mounting direction is also performed in the cloud-side control unit. Therefore, a burden of increase in the volume of handled data and enhancement of the performance of a data processing function need not be placed on the CNC device side. As a result, increase in a cost due to the enhancement of the capacity and performance of each machining center and CNC device is avoided.

In the present invention, further, owing to the tool information updating function added to the automatic manufacturing process setting function of the automatic machining command generation unit, tool information applied to the learned model together with each feature for automatic setting of the manufacturing process is updated referring to the latest tool information stored in the CNC device-side storage unit of the selected machining center. It is assumed that each machining center is used in various manufacturing processes also onsite using tool information and NC programs stored in the storage unit of the CNC device. Therefore, when it is attempted to newly generate a machining command at the automatic machining command generation unit of the cloud-side control unit according to the present invention for a manufacturing process for a new machined product, tool information that will be utilized stored in the cloud-side storage unit in advance may differ from tool information on the CNC device-side that was used in previous manufacturing process. Therefore, according to the present invention, tool information stored in the cloud-side storage unit is updated referring to the latest tool information stored in the targeted CNC device-side storage unit, then a new machining command is generated. Thus, a danger that tool information different from one corresponding to the actuality is used to generate a machining command and the machining command is executed can be avoided; therefore, a safer and more accurate machining command can be generated.

In the present invention, a presently available wired or wireless high-speed, large-capacity communication, for example, an optical line, a fifth-generation (5G) mobile communication system, or the like is utilized as a communication line connecting the cloud server on the Internet and the terminal and the CNC device of each machining center. Thus, data can be transmitted and received between apparatuses without delay substantially in real time and further, simultaneous multiple connections can be implemented. As a result, remote automatic operation control is very smoothly exercised from the terminal on each machining center via the cloud server. The terminal according to the present invention may be a personal computer (hereafter, abbreviated as PC) terminal or a tablet terminal equipped with such a display unit as a PC monitor or a touch panel-type display. For an operator to be able to connect to the Internet via the communication line, the terminal and the CNC device only have to be equipped with a 5G-compatible communication device/module or the like.

For example, the following takes place between the terminal and the cloud-side control unit. When three-dimensional CAD design data of the intended machined product inputted at the terminal is transmitted to the cloud side, at the automatic machining command generation unit of the cloud-side control unit, 3D model of the intended machined product is immediately generated based on the three-dimensional CAD design data by the automatic manufacturing process setting function. Subsequently, one or more different mounting directions that can be taken in the machining unit of the targeted machine tool for the intended machined product are selected. The 3D model is displayed on the terminal-side display in each of these selected mounting directions in a selectable manner. An operator can select an optimum one from among the displayed 3D models in respective mounting directions. Thus, a determination signal resulting from the selection is immediately transmitted to the cloud-side control unit. At the automatic machining command generation unit of the cloud-side control unit, the manufacturing process for cutting operation for each feature required to obtain the intended machined product is automatically set based on the selected mounting direction. Even when the intended machined product is in a complicated shape and three-dimensional CAD design data thereof is relatively large, data processing for generating the 3D model is performed in a short time on the cloud side and transmission of data of the 3D model to the terminal is smoothly advanced without delay.

The mounting direction of the intended machined product selected and determined here refers to an orientation of the intended machined product obtained when machining is finally finished. The cutting operation direction of each feature is determined aiming at this finished state. Further, the machining conditions and the tool trajectory for setting each of the manufacturing process are determined based on the corresponding cutting operation direction. Therefore, the mounting direction of the intended machined product is determined by selecting one that provides substantially most efficient manufacturing process from among one or more different mounting directions automatically proposed and displayed on the display of the terminal.

As one or more automatically proposed different mounting directions, one that can be taken as a mounting direction of the relevant machined product only has to be selected based on the three-dimensional CAD design data acquired from the terminal. For example, by setting a center axis of the intended machined product from an external shape of the machined product, a mounting direction in which an orientation of the center axis is changed can be selected. Specifically, first, a mounting direction in which the center axis is perpendicular and a mounting direction in which the center axis is horizontal can be selected. Aside from the foregoing, a mounting direction in which the center axis is tilted is also selectable depending the external shape of the intended machined product. Aside from the foregoing, a mounting direction in which the center axis is tilted is also selectable depending the external shape of the intended machined product. Therefore, on the cloud side, it takes a very short time to select possible mounting directions of the intended machined product based on the three-dimensional CAD design data as above, to generate 3D models of the intended machined product for each of the selected multiple mounting directions, and display them. And the most suitable one can be selected from among these automatically displayed mounting directions as mentioned above.

Since a machined product often includes at least one face where cut features are usually not formed, taking such a face having no feature, that is, a face that does not require cutting as a mounting face is practical. Therefore, an operator can instantaneously select, as the most suitable mounting direction, one mounting direction in which one face of the intended machined product requiring no cutting provides the mounting face by checking the each 3D model in one or more proposed mounting directions on the display of the terminal. When one or more faces where features are not formed and which can provide the mounting face are present, an operator can easily determine one face to be the mounting face in a short time without complicated computation by a computer, from mounting stability and the like based on the shapes of the intended machined product and a material to be machined and a fixing jig.

For entering the three-dimensional CAD design data at the terminal, an input port such as a USB port provided on the terminal can be used. The terminal can acquire the data stored in, for example, storage media such as USB via the input port. Alternatively, the terminal can acquire the three-dimensional CAD design data of the intended machined product from another computer on a computer network via network communication.

Examples of machine type information of each machining center include: a type, horizontal or vertical; an area for cutting determined according to movements of a table, a column, and a head relative to each axial direction and a table turning angle; maximum dimensions of a workpiece; various traveling speeds (rapid traverse speeds); a spindle end shape; a range of number of spindle revolutions; spindle electromotive power output; a table work area; maximum load weight; a change system, a magazine type, and a maximum number of housed tools of an automatic tool changer (ATC); maximum tool weight; and the like. For further automation and labor saving, some machining centers are provided with an automatic conveying apparatus that automatically conveys a material to be machined to a predetermined position in a machining unit. In case of such a machining center equipped with an automatic conveying apparatus in association with a machine tool, information of the automatic conveying apparatus may be included in machine type information. Examples of types of automatic conveying apparatuses include: those placing and securing a work (material to be machined) stored in a work stocker onto a pallet of a machining unit by a loading system or an auto-work changer comprised of a multi-axis robot arm; a pallet changer or multi-pallet system that changeably conveys a pallet with a material to be machined placed thereon to a predetermined position in a machining unit of a machine tool; and the like.

In the present invention, at the automatic machining command generation unit of the cloud-side control unit, as mentioned above, the 3D model is generated based on three-dimensional CAD design data of the intended machined product transmitted from the terminal. The 3D models are displayed on the display unit of the terminal in respective mounting directions and one optimum mounting direction is determined from among them. Aside from the above-mentioned steps from generation of the 3D model to determination of the mounting direction, features to be formed by cutting operation are extracted relative to the shape of the material to be machined based on the three-dimensional CAD design data.

Based on the mounting direction selected on the terminal side, these extracted features are applied to the corresponding learned model together with machine type information of the machining center contained in the registration list and tool information corresponding to the targeted machining center stored in the cloud-side storage unit. As a result, machining conditions are automatically determined for each feature; tool to use and a tool trajectory are determined based on this machining conditions; and a manufacturing process, starting with specifying tool, and including tool change and execution of the tool trajectory is automatically set for the each feature. Further, a procedure for performing manufacturing processes for all the features are also determined and thus, a series of all the manufacturing processes is set. And a machining command for causing machine tools to perform all the set manufacturing processes is automatically generated based on the learned model.

When the machining command is generated at the automatic machining command generation unit as mentioned above, at the cloud-side control unit, the machining command is transmitted to the CNC device-side control unit and further, it is acknowledged to the terminal that generation of the machining command was completed and the machining command has been transmitted to the CNC device side. Thereafter, at the terminal, a machining command start signal is transmitted from the terminal to the cloud-side control unit side with the operator's arbitrary timing or when a preset time has come. When the machining command start instruction unit receives the machining command start signal from the terminal, the cloud-side control unit transmits a machining command start instruction signal to the CNC device-side control unit to cause the machine tool to perform cutting operations in accordance with the previously transmitted machining command.

Each learned model according to the present invention was obtained by learning, from previously accumulated enormous data of past cutting operations for each type of machining centers, the machining conditions including the used tool and the cutting conditions, and the machining data including the tool trajectory and the executing program therefor as all the data required for cutting operations, with respect to each feature for various features in correspondence with each other. Therefore, machining conditions required for cutting operation and new manufacturing process including a tool trajectory based thereon on each feature for manufacturing a new machined product, are automatically determined and set in a short time based on the learned model. Further, new machining command for causing the machine tool to perform the new manufacturing process is also immediately automatically generated. In the cloud-side storage unit according to the present invention, each time each stored learned model is applied to generation of a new machining command, data related to the new generated machining command is learned and old data is updated. As a result, each learned model is always latest. When a new machining command is generated next, the latest learned model contributes to high precision for setting of a manufacturing process free from interference trajectory leading to further speedup and higher safety.

According to the prevent invention, as mentioned above, an operator need not generate an NC program in advance. The operator only has to input three-dimensional CAD design data at the terminal remote from an actual machine and select an optimum one from one or more mounting directions of 3D models displayed on the display unit as a result. Thus, the operator can generate a machining command for causing a targeted machining center to automatically manufacture an intended machined product. After generation of the machining command, the operator only has to transmit a machining command start signal to the cloud side. Thus, the operator can remotely cause the machining center to initiate a cycle start of manufacturing processes substantially in accordance with the machining command. In addition, in the present invention, the operator can arbitrarily select not only specific machining center but also a plurality of registered machining centers and remotely control them in real time. When several machining centers are of an identical type, the operation can also cause an identical machined product to be manufactured by automatic operation using an identical machining command in them.

Execution of a manufacturing process with the machine tool is substantially achieved by performing a tool trajectory with a specified tool. This execution of the tool trajectory is implemented by relative linear movement or rotational movement between the tool side and a table or the like on the work side caused by motor drive in each axis. That is, the tool trajectory is performed by drive control on a motor in each axis. More specifically, according to an ordinary NC program, each motor is driven by a pulse train signal obtained by read NC data being converted at an information processing circuit. The pulse train signal instructs actual tool movement by a motor rotation angle corresponding to a number of pulses of the signal, that is, position control and further instructs an actual tool moving speed by rotational speed control on a motor corresponding to a pulse frequency. Therefore, execution of the tool trajectory can be achieved by using a corresponding pulse train signal to directly instruct each motor without intervention of an NC program.

Consequently, the machining command for performing the set manufacturing process according to the present invention may, of course, be an NC program as before, but not limited to a program using such the NC language as G code, include such the command signal that directly controls driving of each motor. For example, execution of a series of manufacturing processes can be instructed by what is configured by combining a pulse train signal controlling driving of the motor in each axis corresponding to a tool trajectory with a command signal for tool specification and tool change. The pulse train signal itself can be simply generated based on a pulse train signal which has been used in correspondence with various tool trajectories included in machining data learned when the learned model was generated in advance. Therefore, the machining command may be any other machining program or any command signal that enables direct drive control on the machine tool may be utilized as long as the set manufacturing process can be performed.

In conventional NC programs generated using G code or M code, a very large number of interpolating functions are used. Meanwhile, when a direct command signal without intervention of an NC program is generated and used as a machining command, these interpolating functions are omitted; therefore, reduction of a machining time and enhancement of machining accuracy can be achieved. In addition, by performing positioning by automatically set actual values, not by feedback control, thermal displacement is eliminated and real-time control free from a delay to a command in servo control is implemented. Therefore, any load fluctuation can be instantaneously coped with and as a result, significant reduction of a machining time and enhancement of accuracy can be achieved.

In addition, the automatic machining command generation unit according to the present invention is preferably configured to have a simulation function for automatically verifying whether the tool trajectory of the set manufacturing process enables smooth machining without interference or not and an interference detection function. The simulation function causes the displaying unit of the terminal to display a tool trajectory for a specified tool in a set manufacturing process as 3D computer graphic moving images, for example, animation moving images. The interference detection function stops the moving images and causes an interference alert to be displayed on the displaying unit of the terminal as a result of interference detection, when interference occurs between the tool and a non-cutting area of a material to be machined or peripheral members of the machining unit while the moving images are being displayed. Thus, an operator can check the presence or absence of interference with respect to the tool trajectory of the specific tool while checking moving images and, when the interference alert is displayed, can simply understand that a machining command generated based on the tool trajectory must be modified.

Consequently, by additionally providing the automatic machining command generation unit with a machining command improvement function of, when interference is detected, altering the tool with interference to another tool and causing a machining command to be automatically generated again, a machining command improved to be completely safe can be obtained automatically. With this machining command improvement function, machining conditions and a tool trajectory based on the machining conditions are newly determined in accordance with the altered tool and an improved manufacturing process is automatically set. Further, an improved machining command corresponding to the thus improved manufacturing process is automatically generated. And, the above process from tool change to improvement of the machining command and simulation based on the improved machining command is repeated until interference is eliminated. As a result, a machining command for a manufacturing process in which a tool trajectory is performed without interference are automatically generated without need for time-consuming verification or the like by a skilled hand; therefore, an operator can easily perform perfect product machining in a short time with peace of mind.

In the cloud-side control unit according to the present invention, the following is implemented by providing the automatic machining command generation unit with the machining command improvement function as mentioned above: a favorable machining command free from interference is generated by way of the simulation process and then the favorable machining command is transmitted to the CNC device-side control unit. When the machining command start instruction unit receives a machining command start signal from the terminal, a machining command start instruction signal is transmitted to the CNC device-side control unit. Thus, execution of cutting operation in accordance with the favorable machining command transmitted before is started at the machine tool.

The machining command start signal is transmitted from the terminal with an operator's arbitrary timing or when a machining start time has come if such a time is set in advance. In either case, start of execution of cutting operation in accordance with the machining command is on condition that a material to be machined has already been conveyed to a predetermined position in the machining unit. Therefore, the machining command start signal is transmitted from the terminal after completion of conveyance of the material to be machined to the machining unit of machine tool is confirmed. Actual conveyance of the material to be machined to the machining unit may be completed on the machine side by a worker on site before generation of the machining command is started. Instead, a step of conveyance of the material to be machined may be remotely automatically performed.

Various machining centers are often equipped with respective automatic conveying apparatuses for specific materials to be machined. Usually, a material to be machined conveyance program for driving and controlling such the apparatus is stored in each CNC device-side storage unit and is appropriately utilized in cooperation with automatic operation of the machine tool. Also, in the present invention, therefore, when the terminal is connected to the CNC device via a communication line, such the dedicated conveyance program can be remotely utilized and conveyance of the material to be machined can be completed anytime.

It is assumed that the terminal according to the present invention has a function of transmitting, to the CNC device-side control unit of the targeted machining center, an automatic material to be machined conveyance instruction signal for driving via a communication line and controlling the automatic material to be machined conveying apparatus in accordance with the material to be machined conveyance program stored in the CNC device-side storage unit. In this case, an operator remote from an actual machining center can control not only automatic operation of the machining center but also automatic conveyance of the material to be machined.

It is assumed that the terminal further has a function of performing the following operation after the generated machining command is transmitted to the relevant CNC device-side control unit: when it is confirmed that automatic conveyance of the material to be machined to the machining unit of machine tool has been completed, the terminal transmits the machining command start signal to the machining command start instruction unit of the cloud-side control unit. Confirmation itself of completion of conveyance of the material to be machined can be attained by determining that execution of the material to be machined conveyance program is completed by, for example, receiving a code indicating termination of the program. Therefore, the machining command start signal may be transmitted anytime as long as this code indicating termination of the program has been received.

Aside from confirming completion of execution of the program by a signal of the termination code from the CNC device side as mentioned above, as conveyance completion confirming means may be so configured that the conveyance completion is directly visually confirmed. In this case, it is more reliable and favorable that completion of conveyance of the material to be machined to the predetermined position in the machining unit can be confirmed by a monitor image displayed in the display unit using a monitor function of the terminal. In many machining centers, the machine tool is equipped with such an image pickup device as a CCD camera and a picked-up image of a peripheral area of the machining unit is displayed on a display of the CNC device so that the area can be visually checked. In the present invention, consequently, image data from the image pickup device installed in each of such machine tools can be utilized to confirm whether conveyance of the material to be machined to the machining unit of the machine tool has been completed or not.

In this case, the terminal acquires image data of the peripheral area of the machining unit with the material to be machined placed therein, obtained from one or more image pickup devices installed in each machine tool, from the CNC device via the communication line. As a result, an operator can directly confirm from the monitor image of the peripheral area of the machining unit displayed in the display unit of the terminal whether conveyance of the material to be machined has been favorably completed or not. After completion of conveyance is confirmed, the operator transmits the machining command start signal from the terminal to the machining command start instruction unit of the cloud-side control unit with arbitrary timing. On reception of this machining command start signal from the terminal, the machining command start instruction unit can transmit the machining command start instruction signal for starting the machining command to the CNC device-side control unit.

In the present invention, the automatic machining command generation unit of the cloud-side control unit is possibly provided with a machining center determination unit that determines a machining center to be used in cutting operation for an intended machined product from among the machining centers registered in the registration list. In some cases, an operator can promptly select the suitable machining center from the dimensions and weight of the intended machined product based on his/her experience.

Consequently, the machining center determination unit can be provided with a function of displaying the registration list stored in the cloud-side storage unit in the display unit of the terminal so that any machining center in the list can be selected. Thus, the operator can select the machining center deemed to be suitable for cutting operation for the intended machined product from the registration list displayed in the display unit. In this case, it is desirable that the machining center determination unit is so configured as to be capable of determining the machining center to be used on reception of a selection instruction signal indicating the machining center selected by the operator at the terminal. Further, the present invention may be so configured that at the terminal, an authorized operator can perform an update of the registration list displayed in the display unit, including addition and deletion of a machining center.

For cases where an operator's selection is not depended on, the machining center determination unit may select a machining center of a type suitable for cutting operation for the intended machined product and automatically determine a machining center to be used based on the following pieces of information: design information including the dimensions and weight of the intended machined product acquired from the 3D model generated at the automatic machining command generation unit; and machine type information of each machining center contained in the registration list.

In cases where a plurality of terminals are used, it is desirable to provide the machining center determination unit with a function of avoiding selection of an identical machining center at more than one terminal. For example, the machining center determination unit can be so set that one machining center already selected and used at any other terminal cannot be selected from the registration list displayed in the display unit of one terminal.

For the sake of security, only operators permitted to control automatic operation of the registered machining centers and given access authorization in advance can access the cloud server from the terminal after identity verification. As the identity verification method, a multi-factor authentication method in which a mail address registered in advance is combined with such authentication information as a PIN code or a password, a face authentication method, or the like can be appropriately set.

Effects of the Invention

As described up to this point, the present invention is so configured that the following is implemented. The cloud server connected to the terminal and the CNC devices in each machining center via the communication line is just caused to acquire three-dimensional CAD data of an intended machined product from the terminal. As a result, a 3D model for determining a mounting direction can be formed based on the data. Further, a machining command for performing manufacturing process required for forming all the features of the intended machined product extracted based on the data can be immediately generated by applying the learned model stored in advance in the cloud-side storage unit in correspondence with each previously registered machining center. Therefore, the following effect is brought about in the present invention. Without requiring the CNC device side to have large capacity or high performance for data processing, at the terminal, an operator can simply cause the plurality of remote machining centers to perform the manufacturing processes for manufacturing the intended machined product.

In actuality, in a manufacture of a new machined product by cutting operations, an operator can smoothly perform steps from generation of a machining command for manufacturing the intended machined product for some specific remote machining center to execution of the machining command at the machine tool in real time just by performing five to six simple operations at the terminal. Such operations include: after accessing the cloud server from the terminal, selecting one machining center from the registration list; inputting three-dimensional CAD design data of the intended machined product; selecting an appropriate mounting direction from 3D models in various different mounting directions consequently immediately displayed in the display unit of the terminal; after an appropriate machining command is generated on the cloud side based on the selected mounting direction, transmitting an automatic material to be machined conveyance instruction signal to the CNC device; and after confirming completion of conveyance with a monitor image, transmitting a machining command start signal to the cloud side with arbitrary timing.

BRIEF DESCRIPTION OF DRAWINGS

Hereafter, a description will be given to an embodiment of a machining center automatic operating system according to the present invention. In the description of the present embodiment, a case where remote control is exercised between facilities located in a 5G area will be taken as an example. FIG. 1 is a block diagram schematically illustrating a principal part of a machining center automatic operating system according to the present embodiment. A plurality of machining centers (M1, M2, M3, . . . , Mn) as a target of automatic operation control may be installed in an identical facility, may be installed in a plurality of different facilities, or those installed in an identical facility and those installed in different facilities may be present together.

According to the present embodiment, automatic operation control is exercised on these machining centers (M1, M2, M3, . . . , Mn) and the machine tool (MT1, MT2, MT3, . . . , MTn) of each machining center is connected to a CNC device (C1, C2, C3, . . . , Cn) and is numerically controlled in linkage with an automatic tool changer ATC.

More specifically, the automatic operation system 1 of machining centers according to the present embodiment is constructed mainly of: a cloud server 20 on a network of the Internet; a PC terminal 10 as a terminal connected to a cloud-side control unit 21 for the machining center automatic operation system provided in the cloud server 20 via a communication line; the plurality of machining centers (M1, M2, M3, . . . , Mn) whose respective CNC devices (C1, C2, C3, . . . , Cn) are connected to the cloud-side control unit 21 via the communication line. In the present embodiment, the PC terminal 10 and each CNC device is equipped with a 5G-compatible communication device/module and transmit and receive data between one another substantially in real time without delay owing to 5G communication connection with the cloud server 20 via the Internet.

Figure 6:
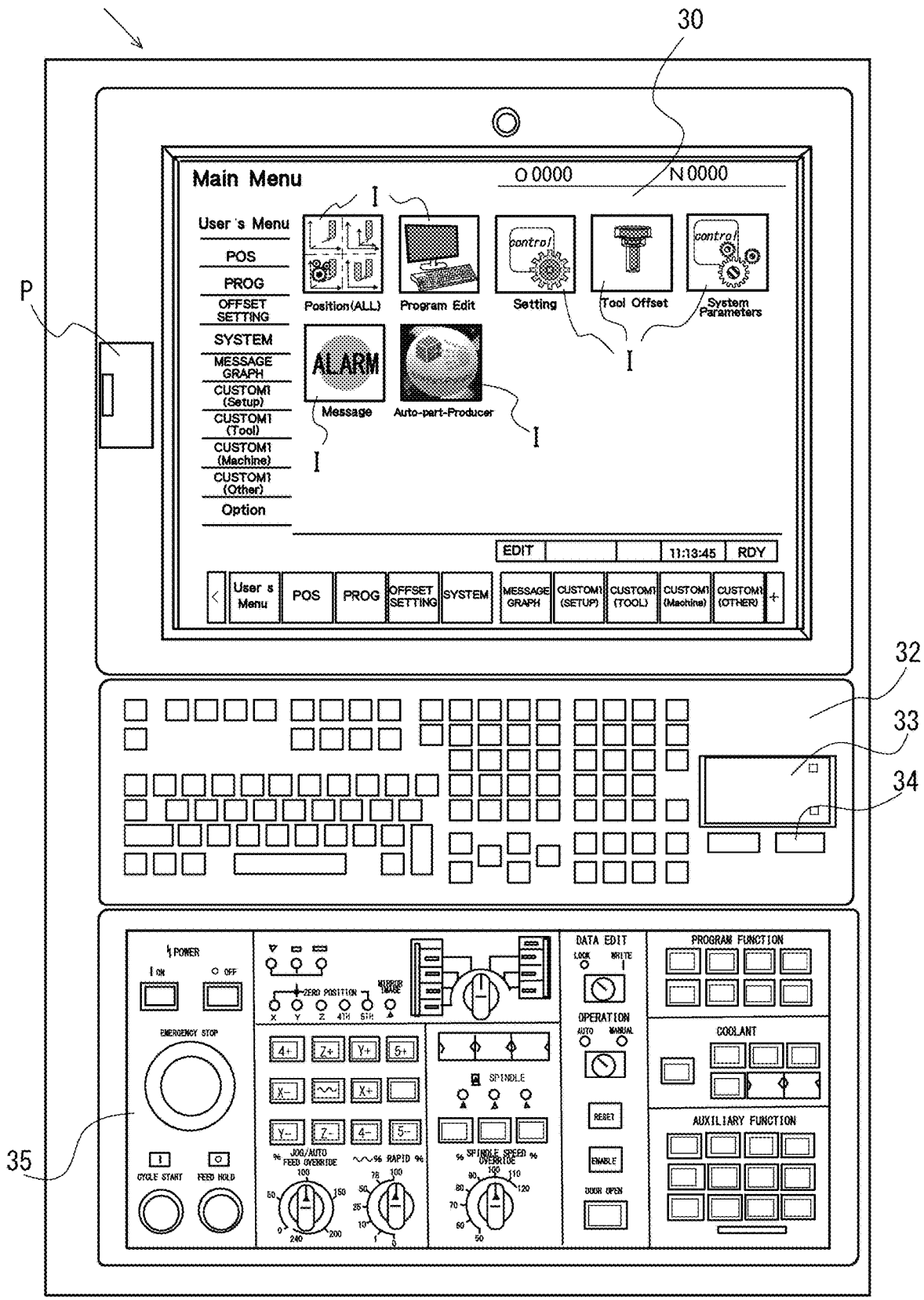
FIG. 6 is a schematic front view illustrating a basic configuration of a control panel of each CNC device.

Each the CNC device (C1, C2, C3, . . . , Cn) in the present embodiment does not require special specifications such as larger capacity and higher performance for processing large amounts of data, may has a basic configuration common to those of conventional CNC devices. More specifically, a front face of the body of the CNC device is a control panel as shown in FIG. 6, and the control panel is provided with a touch panel-type liquid crystal display 30 as a displaying unit. The touch panel-type liquid crystal display 30 displays a menu screen in which items of various work operation modes for a machine tool provided in the CNC device 1 in advance are respectively shown as an icon I. A USB port P is disposed in the vicinity of the display 30 so that varied data can be inputted and outputted, and a keyboard 32 including a mouse pad 33 and a mouse button 34 as a input unit 31 is disposed below the display 30. Further, an operation panel 35 provided with switches and buttons related to various operations of a machine tool is provided in an area below the keyboard 32.

Each the CNC device (C1, C2, C3, . . . , Cn), under its CNC device-side control unit 40, by performing drive control on a machining unit of the machine tool (MT1, MT2, MT3, . . . , MTn) and an automatic tool changer ATC in accordance with a predetermined machining command Mc, causes cutting operation to be performed on a material to be machined while sequentially changing and attaching a tool to a rotary main spindle in correspondence with each manufacturing process. Each the CNC device-side control unit 40 has a CNC device-side storage unit 41 that stores tool information, various machining programs and an APC program for automatic operation of a linked automatic material to be machined conveying apparatus APC.

The tool information stored in each CNC device side storage unit includes identification information corresponding to a large number of tools housed in a magazine or the like of the related machine tool, a type, a shape, a material and the like of each tool associated with the identification information. Each the tool is managed according to the identification information. And each the tool to be used during automatic operation of the machine tool (MT1, MT2, MT3, . . . , MTn) according to a machining command, is appropriately specified based on the identification information and changed and attached between the rotary main spindle of the machining unit and the magazine by an Automatic tool changer ATC, predetermined timing.

In each machining center (M1, M2, M3, . . . , Mn), various manufacturing processes are performed by ordinary operation with the CNC devices (C1, C2, C3, . . . , Cn) on site; the machining centers are updated with the latest tool information (t1', t2', t3', . . . , tn') each time.

According to the present embodiment, a cloud-side storage unit 24 provided in the cloud-side control unit 21 holds a registration list 25 in which the machining centers (M1, M2, M3, . . . , Mn) as a target of automatic operation control are registered in advance. The registration list 25 contains also machine type information (m1, m2, m3, . . . , mn) about the machining centers (M1, M2, M3, . . . , Mn) as a target. Further, the cloud-side storage unit 24 is provided also with a tool information storage unit 26 and a learned model storage unit 27. The tool information storage unit 26 is storing tool information (t1, t2, t3, . . . , tn) about tools housed in a magazine or the like of the machine tool (MT1, MT2, MT3, . . . , MTn) of each machining center (M1, M2, M3, . . . , Mn), and the learned model storage unit 27 is storing relevant learned models (L1, L2, L3, . . . , Ln).

These learned models (L1, L2, L3, . . . , Ln) were generated based on enormous amount of past cutting operation data in advance for each machine tool in each machining center. The each learned model was generated by learning machining data as machining conditions including used tool and cutting conditions and a manufacturing process including a tool trajectory and a machining program with which the manufacturing process was performed, for each feature such as projections and depressions, distortions, holes, pockets, and slots, in faces subjected to various cutting operations, in correspondence with one another.

Further, the cloud-side control unit 21 is provided with an automatic machining command generation unit 22 having: an automatic manufacturing process setting function of automatically setting a manufacturing process for forming features of a newly manufactured intended machined product by applying the features to the learned model for a selected machining center; and a machining command generation function of automatically generating a machining command Mc for causing the machine tool to perform the manufacturing process. In addition, the automatic machining command generation unit 22 has a feature extraction function of extracting each feature of the intended machined product based on acquired three-dimensional CAD design data of the intended machined product. That is, features of the intended machined product applied to the learned model when a manufacturing process is set and a machining command is generated, is obtained from three-dimensional CAD design data of the intended machined product by the feature extraction function.

At an automatic machining command generation unit 22, a step of substantial machining command generation is started when three-dimensional CAD design data of an intended machined product is acquired. This acquisition of three-dimensional CAD design data is achieved by data transmission from a terminal, the PC terminal 10 in the case of the present embodiment. The automatic machining command generation unit 22 is provided with a machining center determination unit 23 that determines a machining center to be used for manufacturing a new intended machined product from among the machining centers (M1, M2, M3, . . . , Mn) registered in the registration list 25. A machining center to be used this time is determined before three-dimensional CAD design data of the intended machined product is acquired.

According to the present embodiment, the machining center determination unit 23 causes the registration list 25 stored in the cloud-side storage unit 24 to be displayed on a liquid crystal display 11 of the PC terminal 10 in such a manner than any machining center in the list can be selected. At the PC terminal 10, an operator O can select a machining center suitable for manufacturing an intended machined product from the registration list 25 based on the dimensions and weight of the machined product. Therefore, when a selection instruction signal for the machining center selected by the operator O is transmitted from the PC terminal 10 to the cloud-side control unit 21, the machining center determination unit 23 determines the machining center as the one that will be used this time from the registration list 25. At the same time, corresponding tool information and learned model to be used to generate a machining command this time are also respectively specified from among those in the tool information storage unit 26 and the learned model storage unit 27.

Therefore, the automatic machining command generation unit 22 generates a relevant machining command while reading the machine type information and tool information of the machining center determined for manufacturing the intended machined product this time and applying the learned model thereof. The automatic manufacturing process setting function of the automatic machining command generation unit 22 includes a tool information updating function as well and the tool information specified when the machining center to be used is determined is updated with the latest tool information stored in the CNC device-side storage unit by this tool information updating function.

The automatic manufacturing process setting function of the automatic machining command generation unit 22 further includes a function of: after each feature of the intended machined product is selected based on three-dimensional CAD design data of the machined product by the feature extraction function, generating a 3D model of the intended machined product, sending its image data and causing the liquid crystal display 11 of the PC terminal 10 to display the 3D model; and then selecting one or more possible different mounting directions of the intended machined product and generating also the 3D model in each selected mounting direction, sending those image data to the PC terminal 10, causing the 3D models to be displayed on the display 11 in a selectable manner. The operator O can select and determine the most suitable mounting direction from among those proposed and displayed on the display 11. Once the mounting direction is determined at the PC terminal 10, a determination signal resulting from the selection it is transmitted to the cloud-side control unit 21. By this, in the machining command automatic generation unit 22, automatic setting of a manufacturing process is forwarded based on the thus determined mounting direction.

In the present embodiment, further, the automatic machining command generation unit 22 is provided with: a simulation function of causing a tool trajectory of an automatically generated manufacturing process to be displayed on the display 11 of the PC terminal 10 as 3D computer graphics, for example, animation moving image; and an interference detection function of, when interference occurs between a tool and a non-cutting area of a material to be machined or peripheral members of the machining unit while moving images are being displayed, stopping the moving image and causing an interference alert to be displayed on the display 11. The automatic machining command generation unit is also provided with a machining command improvement function of, when interference is detected, altering the tool which caused the interference to a different tool and generating a machining command again for the new tool. Hence by automatically repeating the above-mentioned simulation process and improvement of a machining command until interference is eliminated with respect to all the tool trajectories, complete machining commands based on each perfect tool trajectory can be easily obtained in a short time without time-consuming verification by a skilled hand.

Figure 1:
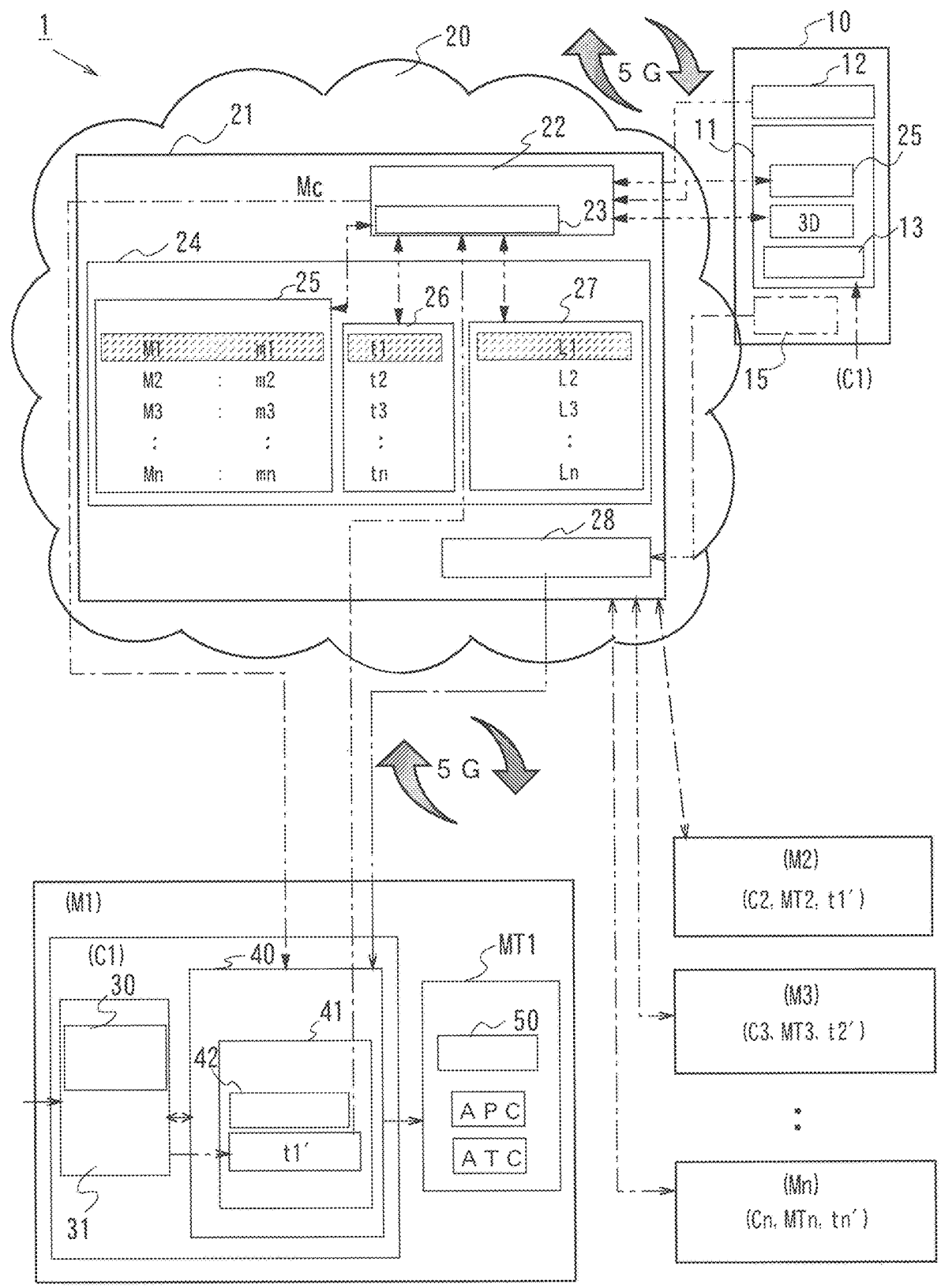
FIG. 1 is a block diagram schematically illustrating a configuration of a principal part of "Machining center automatic operating system" in an embodiment of the present invention.
Figure 3:
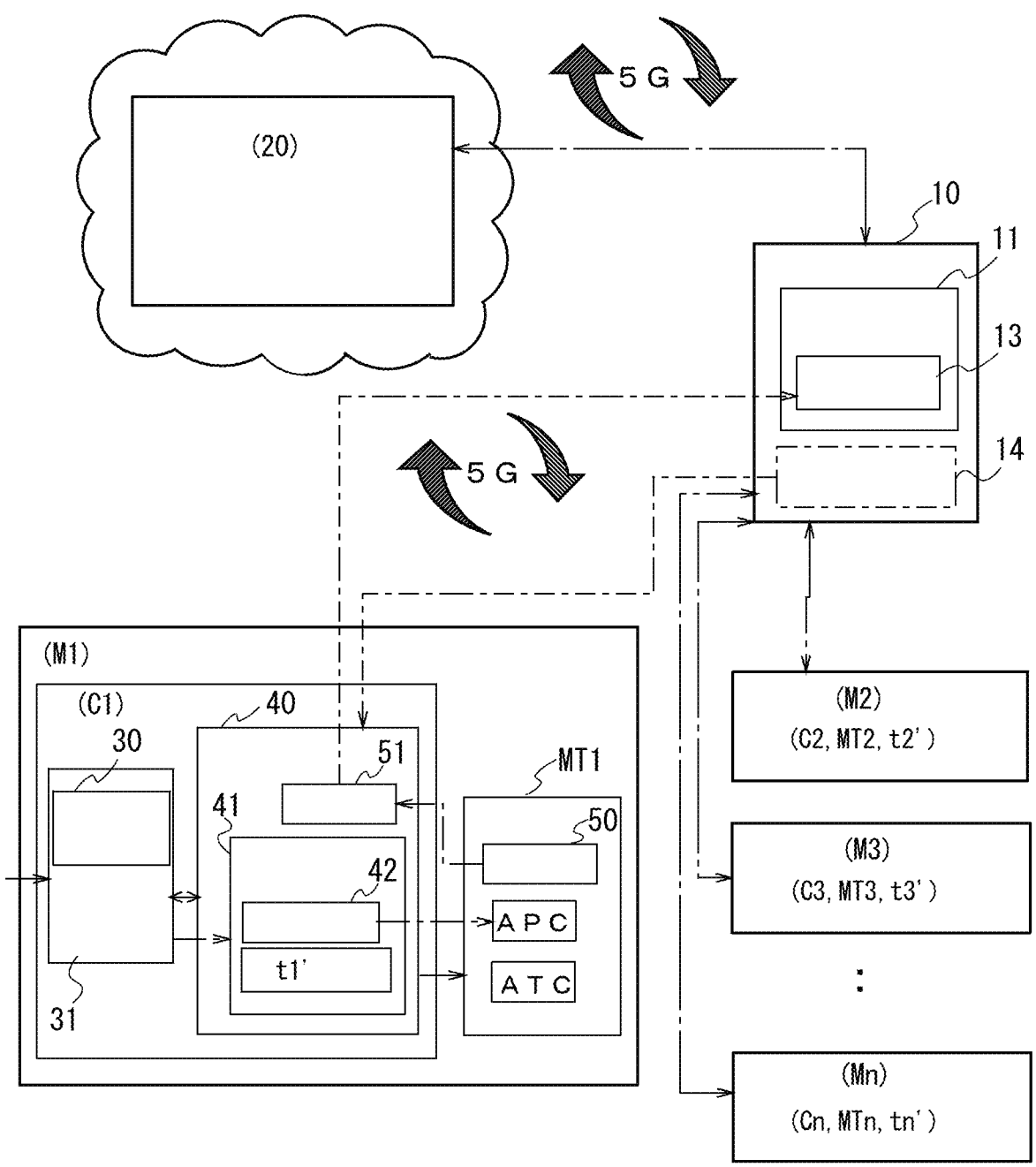
FIG. 3 is a block diagram schematically illustrating a configuration of a mainly portion for carrying out an automatic material to be machined conveying process of in a system different from that of FIG. 1.

In the present embodiment, before the machining command generated and transmitted to the CNC device is executed, a material to be machined has been already automatically conveyed to the predetermined position in the machining unit. That is, as shown in the block diagram in FIG. 3, the PC terminal 10 causes automatic conveyance of the material to be machined separately from system of the automatic generation of the machining command Mc through the cloud server 20 in FIG. 1. The machine tool of each machining center is collaboratively provided with an automatic material to be processed conveying apparatus suitable for the machine type thereof.

For example, it is assumed that the machining center is provided with a pallet changer APC in such a manner that the pallet changer can be in linkage with the machine tool. The pallet changer is so configured that when the material to be machined is changeably placed onto a pallet by a robot and controls the pallet with the material to be machined placed thereon is moved to the predetermined position in the machining unit, the material to be machined is thereby positioned in the machining unit. In this case, in ordinary use, the CNC device-side control unit 40 executes the program 42 for APC stored in the CNC device-side storage unit 41 and thereby automatically controls the pallet changer APC.

In the present embodiment, therefore, while the machining command Mc corresponding to cutting operations for manufacturing the intended machined product is generated at the cloud server 20, the PC terminal 10 directly transmits an automatic material to be machined conveyance instruction signal 14 to the CNC device via the communication line. The PC terminal thereby causes the CNC device-side control unit 40 to drive and control the pallet changer APC using the program 42 for APC. Thus, the pallet with the material to be machined placed thereon is automatically moved and conveyance of the material to be machined to the machine tool machining unit is completed.

A machining command start instruction unit 28 of the cloud-side control unit 21 confirms that the material to be machined has been conveyed and positioned in the predetermined position in the machining unit of the machine tool. Thereafter, the machining command start instruction unit transmits a machining command start instruction signal to the CNC device-side control unit 40 so as to cause the previously transmitted machining command to be executed. As a means for the machining command start instruction unit 28 to confirm that conveyance of the material to be machined has been completed, an exit code of the program for APC from the CNC device side may be used. In the present embodiment, drive-control on the automatic material to be machined conveying apparatus APC is started by the PC terminal 10. Therefore, completion of conveyance is confirmed at the PC terminal 10 and after the confirmation, the machining command start instruction signal is transmitted to the CNC device-side control unit 40 based on a machining command start signal 15 transmitted from the PC terminal 10. At this time, transmission of the machining command start signal 15 may be immediately performed by the operator O. Instead, a predetermined time at which a manufacturing process according to the machining command Mc is desired to be actually performed by the machine tool MT1 may be set. Thus, when the set time has come, the machining command start instruction signal is transmitted.

When a code indicating exit from the program for APC can be acquired through the CNC device, at the PC terminal 10, completion of conveyance of the material to be machined can be confirmed but completion of conveyance is more reliably visually checked in addition. The machine tool is equipped with one or more image pickup devices 50, for example, CCD cameras that pick up at least an image of a peripheral area of the machining unit and the image from the image pickup devices is displayed in a display 30 of the CNC device. In the present embodiment, consequently, the PC terminal 10 can monitor conveyance of the material to be machined in the machining unit by directly acquiring image data 51 of the peripheral area of the machining unit from the CNC device via the communication line and causing the image data to be displayed in the liquid crystal display 11 thereof.

Therefore, the operator O can reliably confirm completion of conveyance of the material to be machined to the predetermined position in the machining unit from a monitor image 13 of the peripheral area of the machining unit displayed in the liquid crystal display 11 of the PC terminal 10. Thereafter, the operator can transmit the machining command start signal 15 to the machining command start instruction unit 28 of the cloud-side control unit 21. On reception of the machining command start signal 15 from the PC terminal 10, the machining command start instruction unit 28 transmits the machining command start instruction signal to the CNC device-side control unit 40. On reception of the machining command start instruction signal from the machining command start instruction unit 28, the CNC device-side control unit 40 performs cycle start to cause the machine tool to execute the machining command transmitted before.

Figure 2:
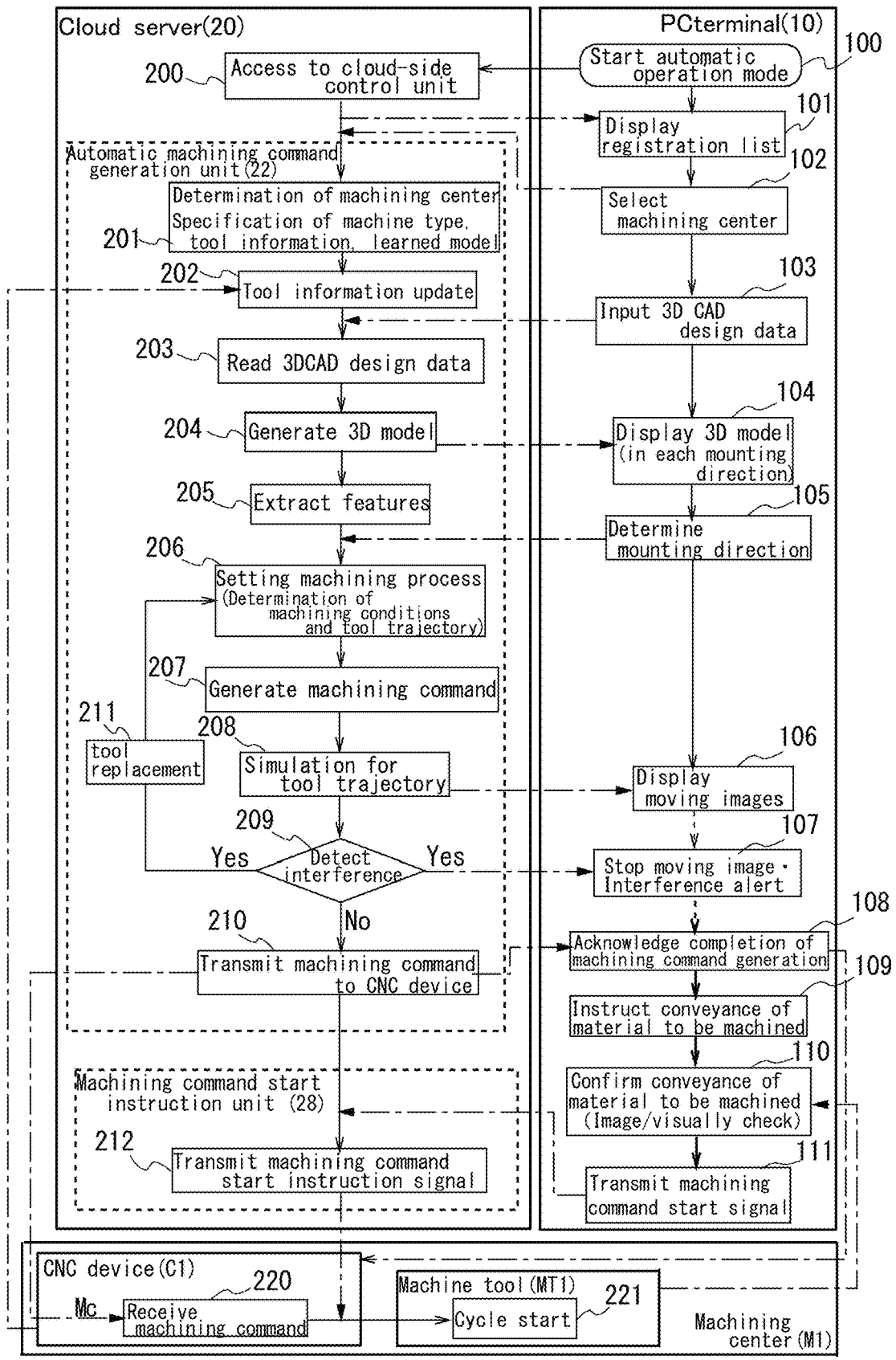
FIG. 2 is a flowchart illustrating an example of operation in the principal part of "Machining center automatic operating system" in FIG. 1.
Figure 4:
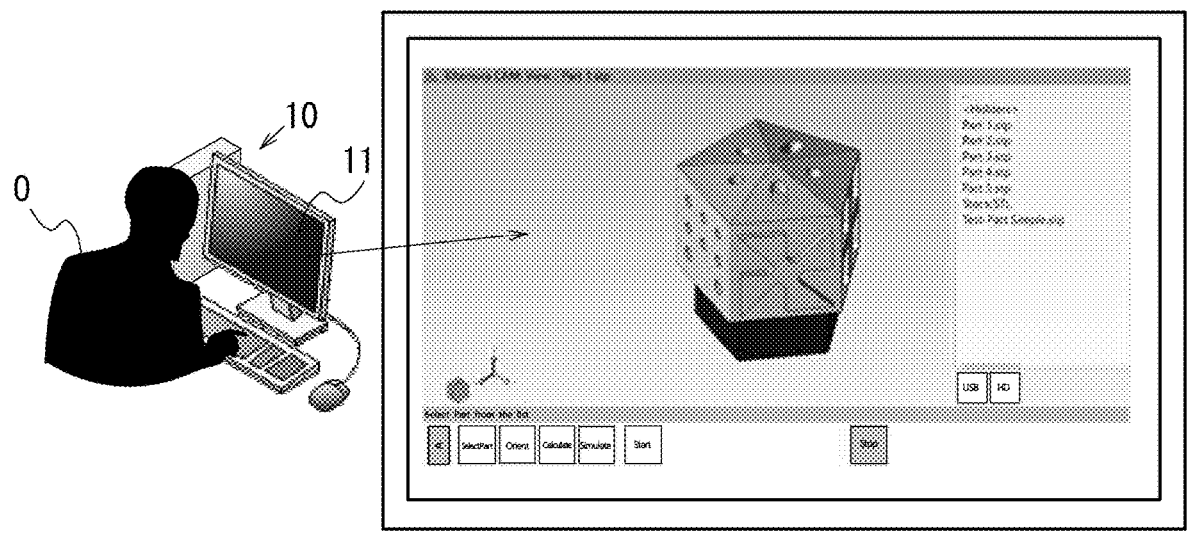
FIG. 4(a) is a schematic diagram illustrating an example of displaying on the display unit of the PC terminal a 3D model of the intended machined product generated in the machining command generation process shown in FIG. 2 and shows the 3D model display screen that appears immediately after three-dimensional CAD design data of the intended machined product is read.
FIG. 4(b) is a schematic diagram illustrating an example of displaying on the display unit of the PC terminal a 3D model of the intended machined product generated in the machining command generation process shown in FIG. 2 and shows a display screen that appears when one of 3D models displayed in proposed different mounting directions is selected.
Figure 4:
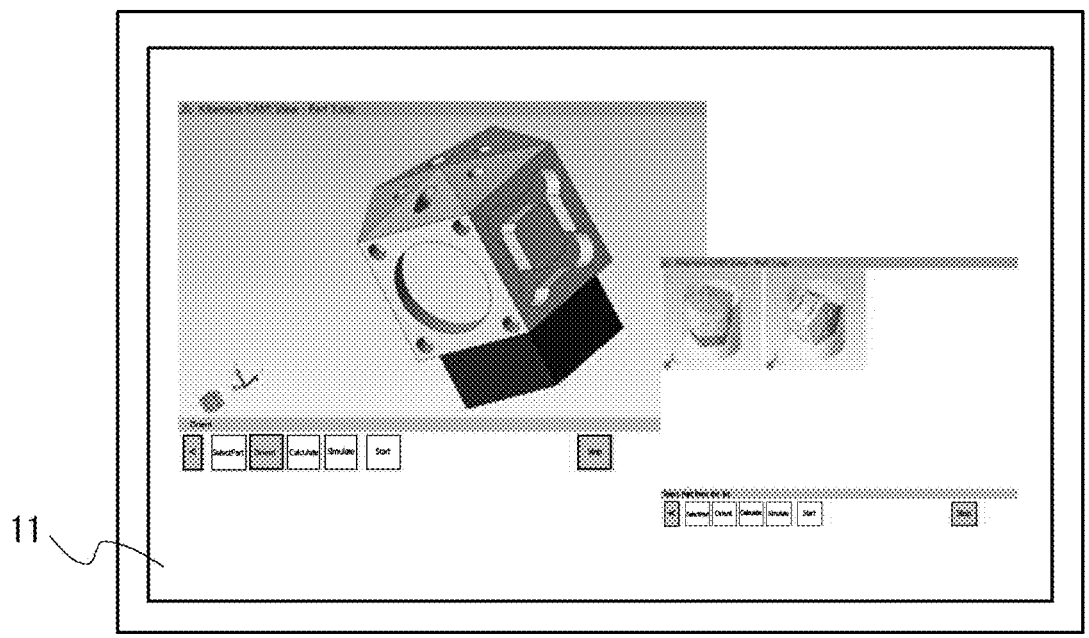
Figure 5:
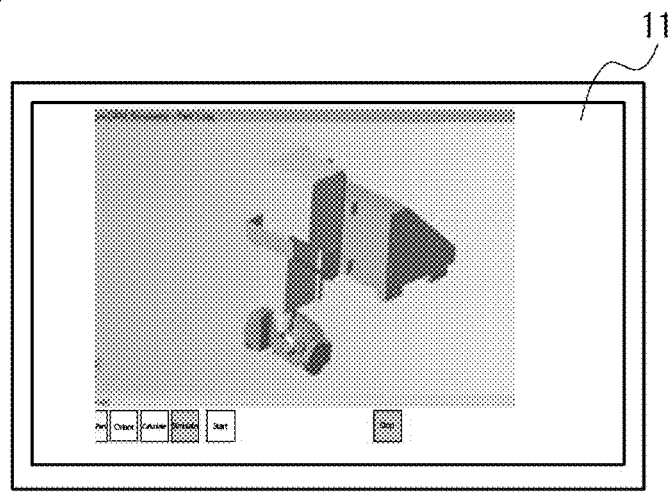
FIG. 5(a) is a schematic diagram illustrating an example of a screen in which animation moving images are displayed on the display unit of the PC terminal during a tool trajectory simulation in FIG. 2 and shows a display screen that appears at the beginning of the simulation.
FIG. 5(b) is a schematic diagram illustrating an example of a screen in which animation moving images are displayed on the display unit of the PC terminal during a tool trajectory simulation in FIG. 2 and shows a display screen that appears when the simulation is in progress.
FIG. 5(c) is a schematic diagram illustrating an example of a screen in which animation moving images are displayed on the display unit of the PC terminal during a tool trajectory simulation in FIG. 2 and shows a display screen that appears when the simulation ends.
Figure 5:
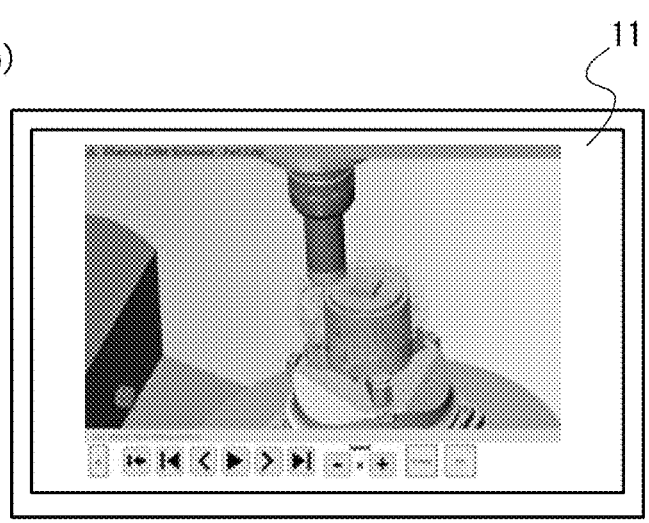
Figure 5:
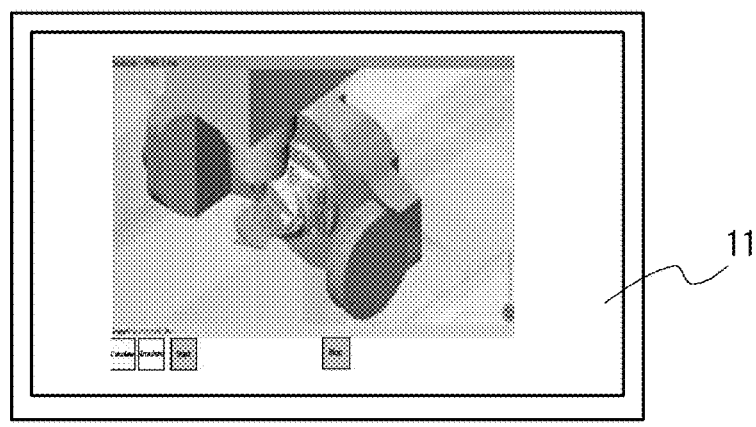

Hereafter, a description will be given to the following steps performed by the automatic operation system 1 of machining centers configured as mentioned above according to the present embodiment with reference to the flowchart in FIG. 2: from the step of selecting the machining center M1 to be used for manufacturing the intended machined product to the step of automatically generating a machining command corresponding to cutting operations and executing the machining command at the machining center M1. FIG. 4 and FIG. 5 are schematic diagrams showing examples of screens displayed in the liquid crystal display 11 of the PC terminal 10 in respective phases of the automatic manufacturing process setting step.

First, at the PC terminal 10, an operator O selects an application equivalent to an "automatic operation of machining center" mode from a menu of various applications displayed in the liquid crystal display 11 and launches the application. Thereby, an automatic operation mode of machining centers is started (Step 100). At this time, the operator O inputs authentication information, such as previously registered his/her own PIN code such as address and password, or face image or the like, to the cloud server 20 to obtain authenticity. Thereafter, the operator accesses the cloud-side control unit 21 (Step 200) for automatic operation of machining centers.

The automatic machining command generation unit 22 of the cloud-side control unit 21 transmits data of a registration list 25 of the machining centers (M1, M2, M3, . . . , Mn) stored in the cloud-side storage unit 24 to the PC terminal 10 provided with access, and causes the liquid crystal display 11 to display the registration list 25 (Step 101). At the PC terminal 10, the operator O selects a machining center suitable for manufacturing the intended machined product of this time from the registration list 25 displayed in the liquid crystal display 11 (Step 102). In the example of the present embodiment, the machining center M1 is selected.

A selection instruction signal indicating selection of the machining center M1 is transmitted from the PC terminal 10 to the automatic machining command generation unit 22. Based on the selection instruction signal, here, the machining center determination unit 23 determines the machining center M1 to be used this time and specifies machine type information m1, tool information t1, and learned model L1 to be used at the same time as the determination (Step 201). Subsequently, with respect to the specified tool information t1, the latest tool information t1' stored in the CNC device-side storage unit 41 of the corresponding CNC device C1 is read and the tool information t1 is updated (Step 202).

At the PC terminal 10, meanwhile, after selecting the machining center M1 to be used, the operator O acquires three-dimensional CAD design data of the intended machined product from a data acquisition unit 12, and transmits the data to the automatic machining command generation unit 22. Thereby, input of the three-dimensional CAD design data (Step 103) is completed. When the three-dimensional CAD design data is stored in a USB-compliant device, the data is acquired through a USB port as the data acquisition unit 12. Instead, the data may be read from any other computer via a computer network in some cases.

After reading the three-dimensional CAD design data (Step 203), the automatic machining command generation unit 22 generates a 3D model of the machined product based on the three-dimensional CAD design data (Step 204). Subsequently, the automatic machining command generation unit selects one or more mounting directions applicable to the machined product and transmits image data of 3D models in respective selected mounting directions to the PC terminal 10 and further, performs extraction of all the features (Step 205).

The PC terminal 10 displays the 3D model on the display 11 in each selected mounting direction (step 104). Here, those 3D models are displayed so that any one can be selected arbitrarily. As shown in FIG. 4, a case where the external shape of the intended machined product is a pentagonal pyramidal prism (a shape obtained by mating a pentagonal pyramid with the upper face of a pentagonal prism) will be taken as an example. In this case, a mounting direction in which the center axis of the pentagonal pyramidal prism is perpendicular and a mounting direction in which the center axis is horizontal are selected. However, in the case of the horizontal mounting direction, one of the side faces of the pentagonal prism portion will be selected as a mounting face.

When the operator O selects one 3D models in a mounting direction determined to be most suitable from among the displayed 3D models in the different mounting directions on the display 11, the mounting direction is determined (step 105). In the case of the above pentagonal pyramidal prism, the bottom face of the pentagonal prism portion does not have features and does not require cutting. Therefore, a direction in which the bottom face provides a mounting face, that is, the mounting direction in which the center axis is perpendicular can be immediately determined to be practical and most suitable.

When the mounting direction most suitable for the intended machined product is selected by the operator O, the PC terminal 10 transmits a determination signal indicating the selected mounting direction of the 3D model to the cloud-side control unit 21. The automatic machining command generation unit 22 of the cloud-side control unit 21 starts substantial setting of a manufacturing process (Step 206) based on the mounting direction indicated by the transmitted determination signal.

That is, each feature extracted before is applied to the learned model L1; a tool suitable for machining each feature is selected from among the tools contained in the tool information t1 updated most recently; various cutting conditions and machining conditions are determined; and a tool trajectory for each tool is also determined based on the machining conditions. Then, a manufacturing process including specification of a tool, replacement of tool and a tool trajectory required for cutting operation for each feature is set. In cases where a plurality of types of features are present, manufacturing processes corresponding to all the features are set, and an efficient procedure for a series of all the manufacturing processes required for manufacturing the intended machined product is set. Thereafter, a machining command for causing the machine tool to perform all the set manufacturing processes is immediately generated (Step 207).

When setting of the manufacturing processes and generation of the machining command are completed as mentioned above, a simulation step is immediately started (Step 208) for all set the tool trajectory in the series of manufacturing processes. The automatic machining command generation unit 22 transmits moving image data of 3D animation generated in this simulation step to the PC terminal 10. At the PC terminal 10, as shown in FIGS. 5(a) and 5 (b), the moving images are displayed in the display 11 by 3D animation (Step 106). During this simulation, for each tool, any interference between the tool and an unprocessed area of the material to be machined or peripheral members of the machining unit of the machine tool is detected along the tool trajectory (Step 209). When interference does not occur, as shown in FIG. 5(c), simulation moving images of the tool trajectories are displayed to the last without interruption and ended. When interfere does not occur and interference detection is denied, it is judged with carefreeness that the manufacturing processes and the machining command Mc set and generated based on the relevant tool trajectories are perfect and can be implemented on the machine tool MT1 without interference.

Meanwhile, when interference occurs during the simulation and interference detection is affirmed, a warning signal is transmitted to the PC terminal 10, the simulation moving image is stopped, and an interference alert is displayed in the display 11 (Step 107). When interference detection is affirmed, the automatic machining command generation unit 22 identifies a tool causing the occurrence of the interference and selects the next best tool based on the learned model L1 to perform tool replacement (Step 211). Then, the automatic machining command generation unit determines machining conditions and a tool trajectory again for the replaced tool and re-sets a manufacturing process with the replaced tool (Step 206). Thereafter, a machining command is generated again in correspondence with the improved manufacturing process (Step 207). This routine from tool replacement to machining command alteration is repeated until occurrence of interference during simulation is eliminated, for each tool that caused interference; therefore, an improved machining command with perfect tools and tool trajectories is simply generated in a short time.

When it is determined that the feasible perfect machining command Mc free from interference has been generated as mentioned above, this machining command Mc is transmitted to the CNC device and the machining command Mc is received at the CNC device-side control unit 40 (Step 220). At the same time, a signal indicating that generation of the machining command Mc is completed is transmitted to the PC terminal 10. On reception of this signal, it is determined at the PC terminal 10 that completion of generation of the machining command is acknowledged (Step 108), a signal instructing conveyance of the material to be machined is transmitted directly to the CNC device C1 via the communication line (Step 109).

On reception of the material to be processed conveyance instruction from the PC terminal 10, the CNC device-side control unit 40 drives and controls a pallet changer as the automatic material to be machined conveying apparatus APC using the program 42 for APC stored in the CNC device-side storage unit 41 in advance. The CNC device-side control unit thereby conveys the material to be machined to the predetermined position in the machining unit of the machine tool MT1. At this time, images of the peripheral area of the machining unit are picked up by image pickup devices 50, such as CCD cameras, mounted in the machine tool MT1 and image data 51 obtained by the image pickup is transmitted to the CNC device-side control unit 40.

The PC terminal 10 acquires this image data 51 directly from the CNC device C1 and displays the monitor image 13 thereof on the display 11. The operator O can view the monitor image 13 of the peripheral area of the machining unit on the display 11 and receive an execution completion code for the program 42 for APC from the CNC device C1. The operator can thereby confirm without fail that the material to be machined has been conveyed to the predetermined position in the machining unit. When conveyance of the material to be machined is confirmed at the PC terminal 10 (Step 110), the operator O can transmit the machining command start signal 15 to the machining command start instruction unit 28 of the cloud-side control unit 21 (Step 111).

According to the machining command start signal 15 from the PC terminal 10, the machining command start instruction unit 28 judges that conveyance of the material to be machined has been completed and transmits the machining command start instruction signal to the CNC device-side control unit 40 (Step 212). That is, the machining command start instruction unit 28 is kept in a standby state because of uncompleted conveyance of the material to be machined until the machining command start signal 15 is received from the PC terminal 10. Receiving the machining command start instruction signal, the device-side control unit 40 performs a cycle start on the machine tool MT1 to start automatic operation in accordance with the machining command Mc received before.

According to the present embodiment, as mentioned up to this point, in manufacture of a new intended machined product by cutting operations, an operator can smoothly perform the steps from generation of the machining command for manufacturing the intended machined product for the remote machining center to execution thereof with the machine tool in real time just by, after accessing the cloud server from the PC terminal 10, performing the following five to six simple operations at the PC terminal 10: selecting one machining center from the registration list 25; inputting three-dimensional CAD design data of the intended machined product; selecting one appropriate mounting direction from 3D models displayed in various different mounting directions immediately displayed in the display 11 as a result; after the appropriate machining command is generated on the cloud side based on the selected mounting direction, transmitting the automatic material to be machined conveyance instruction signal 14 to the CNC device; and after confirming completion of conveyance from the monitor image 13, transmitting the machining command start signal 15 to the cloud side with arbitrary timing.

In some cases, a plurality of operators are authorized to utilize the machining center automatic operating system according to the present invention or a plurality of terminals are available to these operators. When a first operator selects one machining center from the registration list 25 at a first terminal in such a case, the machining center can be already selected by a second operator at a second terminal different from the first terminal and used in a manufacturing process. In this case, the registration list 25 is displayed in the display unit of the first terminal in such a manner that the machining center cannot be selected. As a result, the first operator can select any other alternative machining center. Or, the first operator can select and use the machining center after the second operator's use of the machining center is ended and the machining center becomes selectable from the registration list 25.

EXPLANATION OF REFERENCE NUMERALS AND SYMBOLS

1: Machining center automatic operating system
0: Operator
10: PC terminal
11: Display
12: Data acquisition unit
13: Monitor image
14: Automatic material to be processed conveyance instruction signal
15: Machining command start signal
20: Cloud server
21: Cloud-side control unit
22: Automatic machining command generation unit
23: Machining center determination unit
24: Cloud-side storage unit
25: Registration list
26: Tool information storage unit
27: Learned model storage unit
28: Machining command start instruction unit
M1, M2, M3, . . . , Mn: Machining center
m1, m2, m3, . . . , mn: Machine type information
t1, t2, t3, . . . , tn: Tool information
t1', t2', t3', . . . , tn': (CNC device-side) tool information
L1, L2, L3, . . . , Ln: Learned model
C1, C2, C3, . . . , Cn: CNC device
MT1, MT2, MT3, . . . , MTn: Machine tool
ATC: Automatic tool changer (pallet changer)
APC: Automatic material to be processed conveying apparatus
30: (CNC device) touch panel-type display
31: Input unit
32: Keyboard
33: Mouse pad
34: Mouse button
35: Operation panel
P: USB port
40: CNC device-side control unit
41: CNC device-side storage unit
42: Program for APC
50: Image pickup device
51: Image data

The invention claimed is:

1. A machining center automatic operating system that selectively exercises automatic operation control on a plurality of machining centers, each equipped with a CNC device exercising numerical control on its machine tool and an automatic tool changer, including:
   a cloud-side control unit that is provided in a cloud server on a network connected to the CNC device of each machining center via a communication line, and configured to generate a machining command for each machine tool and transmit the machining command to a corresponding CNC device; and
   one or more terminals configured to display information transmitted from the cloud-side control unit on a display unit, input a three-dimensional CAD design data of an intended machined product and transmit the three-dimensional CAD design data to the cloud-side control unit via a communication line,
   wherein each of the CNC devices includes:
   a CNC device-side control unit configured to exercise driving control on a machining unit of the machine tool and the automatic tool changer in accordance with the predetermined machining command, replacing and attaching a tool to a rotary spindle of the machining unit in correspondence with each manufacturing process contained in the machining command, and while doing this, for execution of cutting operation on a material to be machined; and
   a CNC device-side storage unit that holds tool information including identification information of a plurality of tools housed in such a manner that the tools can be changed and attached to the rotary spindle via the automatic tool changer, housing position information of each tool, and the material and shape of each tool corresponding to the identification information, wherein the cloud-side control unit includes:

an automatic machining command generation unit configured to automatically generate the machining command for causing the machine tool of one previously selected machining center to perform all the manufacturing processes required to cut the material to be machined into the intended machined product based on the three-dimensional CAD design data transmitted from the terminal; and a cloud-side storage unit holding a registration list in which all the machining centers to be driven and controlled are registered together with machine type information thereof, wherein the cloud-side storage unit holds tool information and learned models for each machine tool; each learned model was generated by previously learning, with respect to each feature subjected to various cutting operations, machining conditions including a used tool and cutting conditions when a relevant cutting operation was performed and machining data including a tool trajectory and an executing program for the trajectory in correspondence with each other, wherein the automatic machining command generation unit is configured to have:

a feature extraction function of extracting features to be subjected to cutting operation from three-dimensional CAD design data of the intended machined product relative to the shape of the material to be machined;

an automatic manufacturing process setting function of applying relevant tool information and each feature extracted by the feature extraction function to a learned model corresponding to the selected machining center and thereby automatically determining machining conditions required for cutting operation for each feature and automatically setting a manufacturing process including a tool trajectory based on the machining conditions;

an all the manufacturing processes setting function of determining a procedure for performing all the manufacturing processes for the features extracted by the feature extraction function and setting a series of all the manufacturing processes required for completing the intended machined product; and a machining command generation function of generating the machining command for causing the machine tool to perform all the set manufacturing processes based on the learned model, the automatic machining command generation unit is configured to transmit the generated machining command to the corresponding CNC device-side control unit, wherein the automatic manufacturing process setting function of the automatic machining command generation unit includes:

a tool information updating function of updating the tool information to be applied to the learned model together with each of the features referring to the latest tool information stored in the CNC device-side storage unit of the selected machining center before the application of the tool information; and a function of generating a 3D model of the intended machined product based on the three-dimensional CAD design data and displaying the 3D model on the display unit of the terminal and further, selecting one or more different mounting directions of the intended machined product applicable to the machining unit of the machine tool and displaying the 3D models in each of the selected mounting directions on the display unit of the terminal in such a manner that the 3D models can be selected, the automatic manufacturing process setting function automatically setting the manufacturing process for cutting operation for each feature using the updated latest tool information based on one mounting direction selected at the terminal, wherein the terminal is configured to have a function of, after the machining command generated at the automatic machining command generation unit is transmitted to the CNC device-side control unit, transmitting a machining command start signal to the cloud-side control unit with an operator's arbitrary timing or when a preset time has come, and wherein the cloud-side control unit further includes a machining command start instruction unit configured to, when the machining command start signal is received from the terminal, transmit a machining command start instruction signal to the CNC device-side control unit to cause the machine tool to start execution of cutting operation in accordance with the machining command.

2. The machining center automatic operating system according to claim 1, wherein the automatic machining command generation unit is configured to further have:

a simulation function of displaying the tool trajectory of the set manufacturing process on the display unit of the terminal as moving images in 3D computer graphics;

an interference detection function of, when interference occurs between a tool and a non-processed area of the material to be machined or peripheral members of the machining unit while the moving images are being displayed, stopping the moving image and displaying an interference alert; and a machining command improvement function of, when interference is detected, changing the tool causing the interference to another tool, determining another tool trajectory based on machining conditions corresponding to the changed tool to set another manufacturing process, and generating an improved machining command.

3. The machining center automatic operating system according to claim 1, wherein the terminal is connected with the CNC device of each machining center via a communication line in such a manner that the terminal can transmit and receive various signals, wherein each CNC device-side storage unit holds a material to be machined conveyance program for driving and controlling an automatic material to be machined conveying apparatus for automatically conveying the material to be machined to the machining unit of the relevant machine tool, and wherein the terminal is configured to have:

a function of, after the machining command is transmitted from the cloud-side control unit to the CNC device-side control unit, transmitting a material to be machined conveyance instruction signal for driving and controlling the automatic material to be machined conveying apparatus in according with the material to be machined conveyance program to the CNC device-side control unit via the communication line; and a function of, after completion of conveyance of the material to be machined to the machining unit of the machine tool is confirmed, transmitting the machining command start signal to the machining command start instruction unit.

4. The machining center automatic operating system according to claim 3,
wherein the terminal is configured to have: a monitor function of allowing an operator to visually confirm whether conveyance of the material to be machined to the machining unit of the machine tool has been completed or not; and a function of, after completion of conveyance of the material to be machined is visually confirmed, transmitting the machining command start signal to the machining command start instruction unit, and
wherein the monitor function includes a function of acquiring image data of a peripheral area of the machining unit, including a material to be machined placement position, obtained by one or more image pickup devices installed in each machine tool from the CNC device via the communication line and displaying a monitor image of the peripheral area of the machining unit on the display unit of the terminal.

5. The machining center automatic operating system according to claim 1,
wherein the automatic machining command generation unit includes a machining center determination unit that determines a machining center to be used in cutting operation for the intended machined product from among the machining centers registered in the registration list, and
wherein the machining center determination unit is configured to have:

a function of displaying the registration list on the display unit of the terminal in such a manner that any machining center in the list can be selected and, on reception of a selection instruction signal indicating one selected machining center from the terminal, determining the machining center to be used; and/or a function of selecting a machining center of a machine type suitable for cutting operation for the intended machined product based on design information, including the dimensions and weight of the intended machined product, acquired from the 3D model generated at the automatic machining command generation unit and machine type information of each machining center contained in the registration list, and determining the machining center to be used.

6. The machining center automatic operating system according to claim 5,
wherein when a plurality of the terminals are present and the machining center determination unit is configured to have a function of displaying the registration list on the display unit of the terminal in such a manner that any machining center in the list can be selected and, on reception of the selection instruction signal indicating a selected machining center, determining a machining center to be used, the machining center determination unit is configured to have further a function of, when one a machining center to be used has been already determined by one terminal and the registration list is displayed on display units of other terminals, making the already determined machining center unselectable for the other terminals.

* * * * *